ALIGNING APPARATUS

Filed Oct. 28, 1966

INVENTOR.
Robert W. Helda

BY Mueller, Aichele & Rauner

ATTY'S

INVENTOR.
Robert W. Helda

BY

ATTY'S.

United States Patent Office 3,447,224
Patented June 3, 1969

3,447,224
ALIGNING APPARATUS

Robert W. Helda, Scottsdale, Ariz., assignor to Motorola, Inc., Franklin Park, Ill., a corporation of Illinois Filed Oct. 28, 1966, Ser. No. 590,387
Int. Cl. B21f 1/02
U.S. Cl. 29—203 7 Claims

ABSTRACT OF THE DISCLOSURE

A plurality of rotatable lead aligning members having a blade shaped end are moved radially inward to just adjacent a plurality of leads to be straightened. Each blade portion is disposed between two adjacent leads. The blade portions are then rotated to slidably engage two adjacent leads. Each blade portion has a lead receiving notch on one side for receiving one lead. Relative movement between the lead aligning members and the leads is then effected for straightening the leads. The lead aligning members are then rotated back to a disengaging posision and retracted.

This invention relates to a lead aligning apparatus for units having a plurality of deformable leads and more particularly to a lead aligning apparatus for use with semiconductor devices having between about three and sixteen or more leads.

Semiconductor devices usually have deformable leads with small cross sections fabricated from a soft metal which is also a good electrical conductor, such as gold-plated Kovar, nickel, etc. These leads have a long length compared to their cross section. To incorporate these devices in a circuit, it is preferable that these leads extend from the encapsulated portion of the devices in a particular relation to one another. However, during the assembling and handling of the devices these leads tend to become bent and displaced from the preferred particular relation.

Many different apparatus are known for aligning and straightening the leads of units having up to four deformable leads. These apparatus often combine a lead comb with a means for applying pressure to the individual leads to straighten them. Although apparatus are available for aligning and straightening the leads of units having up to four leads, a satisfactory apparatus has not been available for units having a larger number of leads, for example, three, sixteen or more leads.

With units having three or more leads, typically semiconductor devices, the leads have been aligned in a hand operation. This operation is generally rather slow because each lead must be individually aligned. Also, because of the necessary labor, this hand operation adds substantial expense to the completed semiconductor devices. The alignment of the leads by this method is not considered reproducible because of the expected variations in the human element.

Therefore, it is an object of this invention to provide an apparatus for aligning, substantially simultaneously, all of the leads of a multilead unit.

It is another object of this invention to provide an apparatus that automatically aligns the leads of a unit and thereby substantially reduces the time required and the expense per unit for this operation.

It is a further object of this invention to provide an apparatus that aligns the leads of a multilead device in a reproducible manner.

A feature of this invention is a lead aligning apparatus having aligning members corresponding to the lead to be aligned that aligns the lead in a predetermined orientation.

Another feature of the invention is aligning members integrated into a lead aligning apparatus that are movable to a position adjacent the lead and rotatable, after their movement adjacent the lead, so as to encompass the lead such that the maximum open space between adjacent members is less than the diameter of the lead encompassed.

Figures 1, 2:
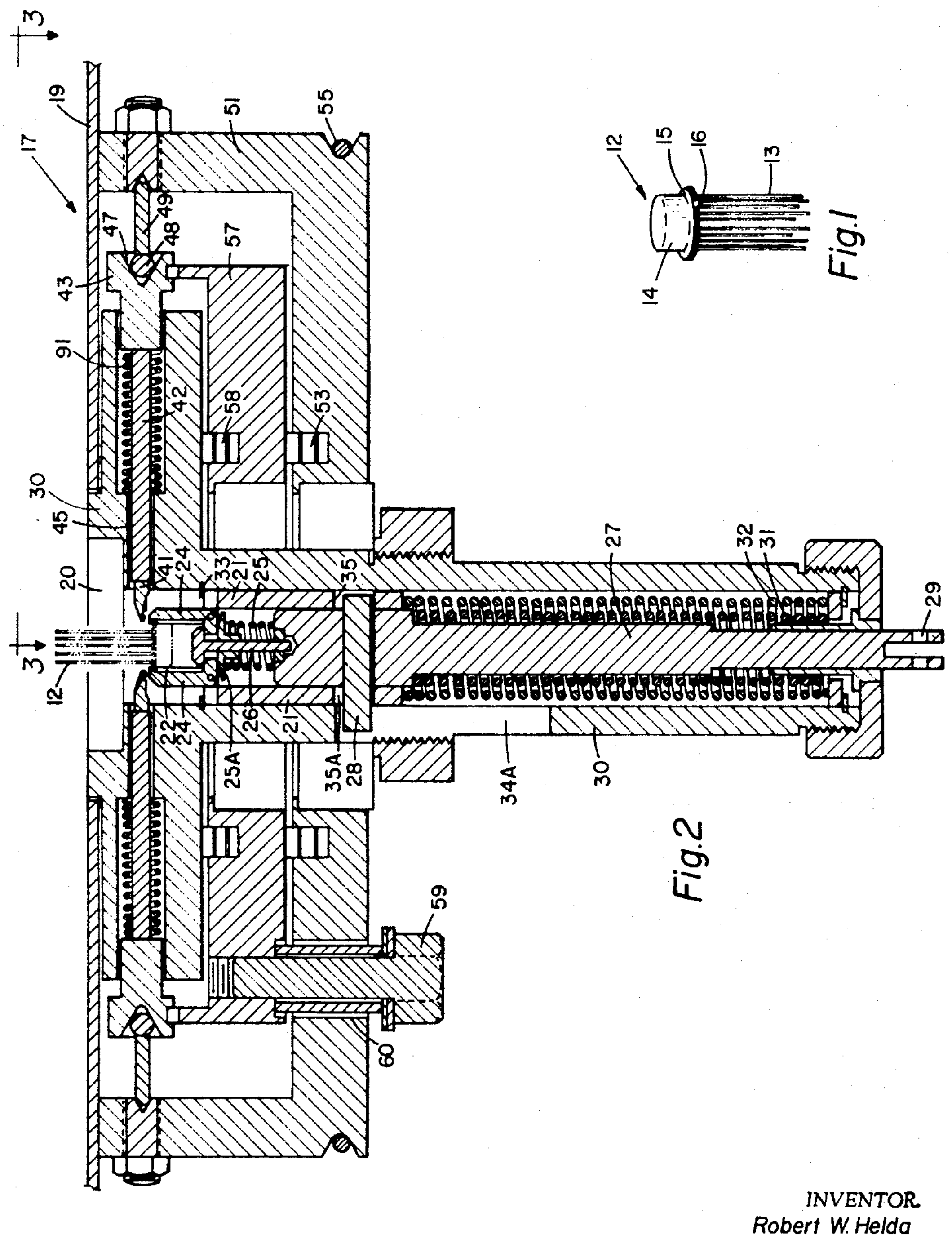
FIG. 1 is an enlarged perspective view of a typical semiconductor device having deformable leads which may be realigned and straightened by the FIG. 2 illustrated apparatus.
FIG. 2 is a cross-sectional view of a lead aligning apparatus embodying the present invention.

An apparatus embodying the invention for aligning, in a predetermined manner, a deformable lead extending from an encapsulated portion of a unit includes a holder for receiving the encapsulated portion and holding means for retaining the encapsulated portion. First and second adjacent aligning members are provided, each having an axis about which each member is rotatable and along which the member is movable. The first and second members are movable to opposed sides of the lead to which they are adjacent when the unit is in the holder and are rotatable to a cooperative relationship to slidably encompass a portion of the lead. When the members are in the cooperative relationship, the first member has a blocking portion opposed a blocking portion on the second member, which blocking portions are adjacent to the leads and spaced apart less than the thickness of the lead. Means is operatively coupled to the members for moving each parallel to its axis. Means is operatively coupled to each member for imparting a rotational motion about its axis. Means is provided for imparting a relative motion between the unit and the members along the lead in a straight line, and means is provided for sequentially actuating the holder, holding means, members and unit.

The alignment apparatus of the invention is advantageously used with units having a plurality of deformble leads, for example, three or more. The number of leads a unit may have that are to be aligned with a particular apparatus is limited by the spacing between adjacent leads. The illustrated apparatus will be utilized with a semiconductor device 12 (FIG. 1) typically having ten deformable leads 13 extending from an encapsulated portion 14. Device 12 may have from three to 16 or more leads according to the electrical components in encapsulated portion 14. A flange 15 including tab 16 encircles encapsulated portion 14. Encapsulated portion 14 may be of the known metal can, plastic or other construction utilized for this function.

Leads 13 are fabricated from a metal which is a good electrical conductor. Leads 13 may have a diameter between about 0.016 and 0.019 inch and a length between about ½ and 1½ inches. The dimensions of the leads to be aligned will vary according to the unit. Because of the large ratio of the length to the cross section and the softness of the metal used in their fabrication, leads 13 are easily deformed.

Leads 13, as shown in FIG. 1, extend from encapsulated portion 14 in one direction in a substantially parallel manner. During the fabrication of devices, such as device 12, these leads are often bent from a preferred alignment. When bent, the lead, as such, is generally straight over the major portion of its length.

Figure 3:
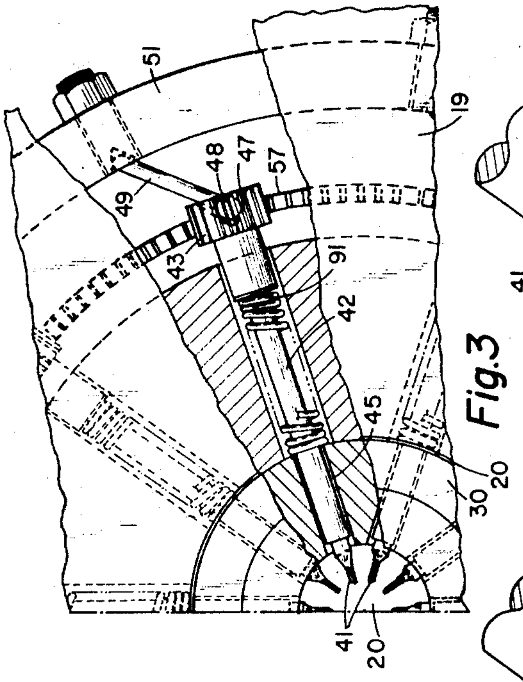
FIG. 3 is a top plan view of the lead aligning apparatus of FIG. 2 along line 3—3.

A lead aligning apparatus 17 (shown in FIGS. 2 and 3) according to the invention is supported by a table (not shown). The upper surface of apparatus 17 is covered by a plate 19 which includes an opening 20 exposing a collet 21. Apparatus 17 is shown in the closed position of the aligning cycle with device 12 retained therein.

Collet 21 has a receptacle portion 22 for receiving encapsulated portion 14 of semiconductor device 12. Flange 15 rests on the top surface of collet 21 receptacle portion 22 and a slot (not shown) is provided therein for receiving a position tab 16 on device 12, which orients the leads in a preselected manner. A pair of opposed fingers 24 are rotatably mounted in slots provided therefor in collet 21. Fingers 24 are shown in a closed position in which they grip the flange of semiconductor device 12 to retain it on collect 21. A spring 25 urges a spring cap 25A upwardly against fingers 24 and causes them to rotate outwardly to release device 12 when apparatus 17 is in an open condition.

A bolt 26 encompassed by spring 25 joins collet 21 to a collet rod 27. Collet 21 is also joined to collet rod 27 by a connecting pin 28 inserted therethrough that rides in an elongated slot 34 in a pin turret 30 surrounding rod 27.

Collet rod 27 is connected at its base 29 to a drive for imparting a downward motion thereto and to collet 21. Collet rod 27 and collet 21 are urged upwardly by springs 31 and 32 within pin turret 30. The upward motion of collet 21 is arrested by a collet stop 33. Collet rod 27 may travel a slight additional amount upward and is stopped in its motion by connecting pin 28 striking the top surface of opening 35 in collet 21.

Adjacent to collet 21 are a plurality of aligning members or separators 41 corresponding in number to leads 13 of semiconductor device 12. Each separator 41 is press fit into a corresponding shaft 42 that is, in turn, press fit into a pinion gear 43 to form a unitary assembly. Separator 41 extends through an opening in pin turret 30 and is guided therein by shaft 42 riding on a bearing surface 45.

The exposed end of pinion gear 43 includes a cone-shaped receptacle 47 for receiving a ball 48 on the end of a toggle 49. Toggle 49 is a connector that extends from cone-shaped receptacle 47 at an angle to shaft 42 (FIG. 3) and is rotatably coupled to a toggle carrier 51.

Toggle carrier 51 is rotatably mounted on pin turret 30 and is partially supported by roller bearings 53. Rotational motion is imparted to toggle carrier 51 by a cable 55 that has a drive controlled by a cam on a common shaft with the drive for collet rod 27.

Pinion gear 43 is meshed with a separator gear 57 that is also rotatably mounted about pin turret 30 and partially supported by roller bearings 58. Separator gear 57 is rotated by a cable (not shown) that is connected to bolt 59 which is movable in a slot 60. A spring (not shown) is attached to separator gear 57 and is biased in a direction opposite to the force exerted by the cable. The rotation of gear 57 is controlled by a cam that is also on a common shaft with the drive for collet 29.

Figure 6:
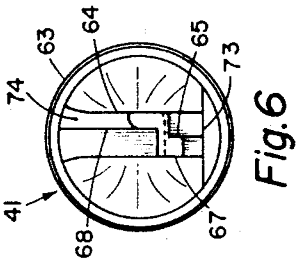
FIG. 6 is an end view of the aligning member shown in FIG. 4.
Figure 4:
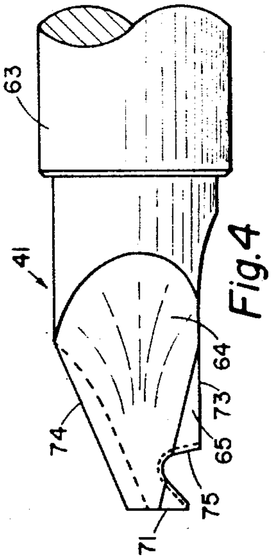
FIGS. 4 and 5 are respectively an enlarged top view and an enlarged side view of an aligning member of the FIG. 2 illustrated lead aligning apparatus.
Figure 5:
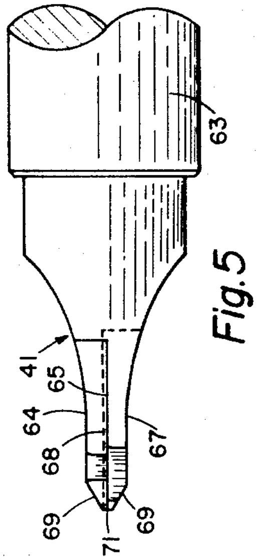

Referring to FIGS. 4, 5 and 6 the details of separator 41 may be observed in these enlarged views. Separator 41 has a main body 63 fabricated from a round rod. The shape of body 63 is not limited to a round configuration, however, round is preferable for ease of machining and for a press fit. The end portion of separator 41 had two substantially parallel major faces, a first face including offset surfaces 64, 65 and a second face including offset surfaces 67, 68. The thickness of the end portion decreases rapidly in two similarly tapered regions 69 to a tip 71. Outside edges 73, 74 are more gently tapered to tip 71.

Near tip 71 a wedge shaped receptacle 75 is cut into edge 73. The curved portion of receptacle 75 has a diameter slightly larger than the leads to be aligned thereby and the open portion is substantially larger. The edges of receptacle 75 are rounded to provide a smoothly tapered transition between the adjacent surfaces. The use and coacting effect of the various portions of separator 41 will be further explained in the description of the aligning operation.

Figure 7:
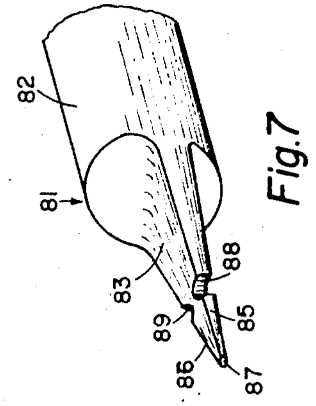
FIG. 7 is an enlarged view of another embodiment of the aligning member.

In FIG. 7 a separator 81 is shown with a different configuration that functions in a manner similar to separator 41. Separator 81 has a large main body 82 integral with two substantially flat faces 83 at the exposed end thereof. The thickness of separator 81 in the portion defined by faces 83 is reduced compared to body 82. Edges 85, 86 are evenly tapered to a blunt tip 87. Separator 81 has two substantially identical wedge shaped receptacles 88, 89 extending inwardly, one from edge 85 and one from edge 86. The curved portions of receptacles 88, 89 are slightly larger than the lead to be aligned thereby, whereas the opening is much larger. The segments of edges 85, 86 just adjacent to receptacles 88, 89, are blocking portions for leads 13 and are spaced when in the aligning position from corresponding segments of adjoining separators a distance less than the diameter of leads 13. The operation and coaction of separators 81 in lead aligning apparatus 17 are similar to that of separators 41.

In the operation of lead aligning apparatus 17, semiconductor device 12 is inserted through opening 20 in plate 19 into receptacle 22. Tab 16 on semiconductor device 12 is positioned in the slot in collet 21 to achieve a proper alignment of leads 13. Collet rod 27 drops a slight amount, and fingers 24 are forced into a closed position (FIG. 3) so that they grip flange 15. Encapsulated portion 14 is now securely held in collet 21 with leads 13 extending generally in a preselected direction.

Figure 8:
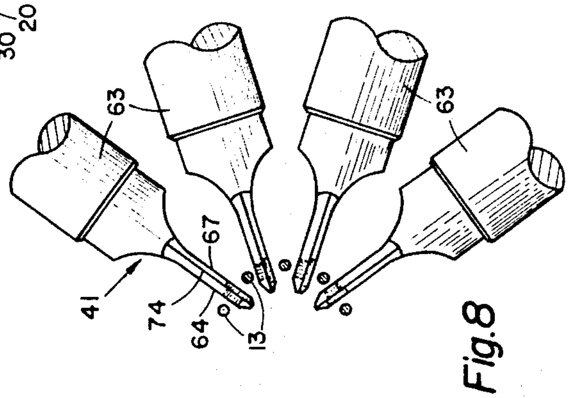

Toggle carrier 51 rotates about 20° around pin turret 30 urging toggle 49 against pinion gear 43. This causes separators 41 positioned with their major faces parallel to the long dimension of leads 13 (FIG. 8) to move inwardly between leads 13. With the thin cross section of separators 41 and their close proximity to encapsulated portion 14, the separators are readily inserted between leads 13 without damaging them.

Figure 9:
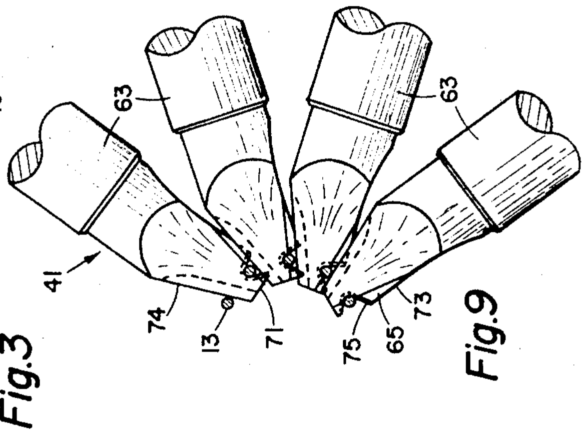
FIGS. 8 and 9 show the aligning members in various positions relative to the leads during the operation of the aligning apparatus.

The rotation of toggle carrier 51 is terminated and separator gear 57 is rotated about 12° around pin turret 30. Separator gear 57 in turn causes pinion gear 43 and separators 41 to rotate. The major faces of separators 41 are now perpendicular to the long dimension of leads 13 (FIG. 9). Surface 65 of one separator contacts surface 68 of an adjacent separator to constitute a loose 360° entrapment of lead 13 within receptacle 75 that permits a slight amount of movement thereof.

With leads 13 entrapped in this manner collet rod 27 is driven downwardly with the attached collet 21 and semiconductor device 12. The downward motion of device 12 terminates with the end portion of leads 13 extending through separators 41. In this position, the leads have been aligned in a straight fashion in a preselected relation to encapsulated portion 14 and to each other. In this embodiment, collet 21 is moved relative to separators 41, however, it is evident that the same results may be obtained by movement of the separators 41 relative to collet 21.

With leads 13 aligned, collet rod 27, collet 21 and device 12 are driven upwardly by springs 31, 32 to the closed position for apparatus 17. Separator 57 is driven in the reverse direction from its original rotation by a spring to return separators 41 to their starting positions with the faces 64, 65 parallel to the long dimension of leads 13. Toggle carrier 51 is driven in the reverse direction from its original rotation by a spring, thereby releasing the pressure on toggle 49 and pinion gear 43. A spring 91 drives pinion gear 43, separator rod 42 and separator 41 outwardly to their initial position. Collet rod 27 travels upwardly a slight additional amount, allowing fingers 24 to open and release flange 14 so that device 12 may be removed from apparatus 17.

Advantageously, the movement of the elements of apparatus 17 are controlled by cams mounted on a common shaft. Additionally, a timing cam that is set to stop the operation of apparatus 17 at preselected points during the aligning cycle may be placed on the common shaft. With this timing cam the condition of leads 13 are easily observed and a receptacle may be placed over leads 13 with device 12 in a fully down position so that they will be inserted therein during the upward motion.

With the apparatus of the invention the output of devices with aligned leads has been increased between about 500 and 700 percent over the previous hand method. Also, for the combined functions of straightening leads and inserting them in receptacles, the output has been increased about 1,300 percent over that achieved by the hand method.

The above description and drawings show that the present invention provides a novel lead aligning apparatus for units having a plurality of deformable leads. Furthermore the lead aligning apparatus of the invention aligns substantially simultaneously and automatically the leads of a multilead device in less time and at a reduced cost than previously required for this operation. Additionally, the lead alignment is reproducible from one unit to another.

I claim:

1. An apparatus for aligning in a predetermined manner a deformable lead extending from an encapsulated portion of a unit, the apparatus including in combination:

a holder for receiving the encapsulated portion;
holding means for retaining the encapsulated portion;
first and second adjacent aligning members each having an axis about which said members rotatable and along which said members movable;
said first and second members movable to opposed sides of the lead adjacent thereto when the unit is in said holder and rotatable to a cooperative relationship to slidably encompass a portion of the lead when said members are in said cooperative relationship;
said first member having a blocking portion opposed a blocking portion on said second member;
said blocking portions being adjacent the lead and spaced apart less than a thickness of the lead;
means operatively coupled to said member for moving each member along said axes, respectively;
means operatively coupled to said members for imparting in each a rotational motion about said axes, respectively;
means for imparting a relative motion between the unit and said members along the lead length; and
means for sequentially actuating said holder, holding means, members and unit.

2. An apparatus according to claim 1 in which said means for imparting rotational motion to said members comprises driven elements affixed respectively to said members and a driving element spaced from said members operatively coupled with said driven elements capable of imparting rotational motion to said driven elements, said driven elements movable parallel to said respective axes while coupled to said driving element.

3. An apparatus according to claim 1 in which said means operatively coupled to said members for moving each parallel to said respective axes comprises a carrier spaced from said members movable relative thereto, connecting rods having opposed ends pivotally engaged respectively with said carrier and said members, said rods capable of being generally in line with said axes, respectively, and means for imparting relative motion between said carrier and said members.

4. An apparatus according to claim 3 including springs disposed about said members and urging said members operatively against said connecting rods.

5. An apparatus according to claim 1 adapted for the alignment of the plurality of deformable leads extending generally in one direction from the encapsulated portion of the unit, the apparatus including a plurality of said first and second members capable of said cooperative relationship to slidably encompass respectively each of the leads.

6. An apparatus according to claim 5 in which said members between adjacent leads are formed in a unitary separator movable between the adjacent leads and capable of cooperative relationship with adjacent separators to encompass the leads in a manner similar to said first and second members.

7. An apparatus for aligning, in a predetermined manner, a plurality of deformable leads extending in a circular pattern generally in one direction from an encapsulated portion of a unit, the apparatus including in combination a holder for receiving the encapsulated portion; holding means for retaining the encapsulated portion; a plurality of adjacent separators each having an axis extending radially away from said holder, said separators having an end portion nearest said holder consisting of opposed major faces, said end portion having a greater width across said faces than thickness therebetween, said separators movable parallel to each axis with said faces parallel to the predetermined alignment of the leads to a juxtaposition adjacent the leads, said separators rotatable about each axis when juxtaposition adjacent the leads to a cooperative relationship to slidably encompass the leads therebetween, when said separators are in said cooperative relationship said adjacent separators having opposed blocking portions, said opposed blocking portions being adjacent the leads and spaced less than the thickness of the leads; means operatively coupled to said separators for moving each parallel to each said axis; means operatively coupled to said separators for imparting in each a rotational motion about each said axis; means for imparting a straight line relative motion between the unit and said separators along the lead; and means for sequentially actuating said holder, holding means, separators and unit.

References Cited

UNITED STATES PATENTS

| | | | |
|---|---|---|---|
| 3,071,166 | 1/1963 | Gutbier | 140—1 |
| 3,106,945 | 10/1963 | Wright et al. | 140—147 |
| 3,122,179 | 2/1964 | Zimmerman et al. | 140—147 |
| 3,151,387 | 10/1964 | Clemens et al. | 29—203 |

THOMAS H. EAGER, *Primary Examiner.*

U.S. Cl. X.R.

140—1, 147